United States Patent
Lee et al.

(10) Patent No.: US 7,974,609 B2
(45) Date of Patent: Jul. 5, 2011

(54) MOBILE COMMUNICATION TERMINAL HAVING FUNCTION OF DISPLAYING COMMUNICATION STATE AND METHOD THEREOF

(75) Inventors: Sang-Hyuck Lee, Seoul (KR); Yeon-Woo Park, Seoul (KR); Jee-Young Cheon, Daegu (KR)

(73) Assignee: LG Electronics Inc., Seoul (KR)

( * ) Notice: Subject to any disclaimer, the term of this patent is extended or adjusted under 35 U.S.C. 154(b) by 169 days.

(21) Appl. No.: 11/538,022

(22) Filed: Oct. 2, 2006

(65) Prior Publication Data

US 2007/0087789 A1 Apr. 19, 2007

(30) Foreign Application Priority Data

Oct. 1, 2005 (KR) ........................ 10-2005-0092694

(51) Int. Cl.
H04M 3/42 (2006.01)
H04M 1/64 (2006.01)
H04M 11/00 (2006.01)
H04B 1/38 (2006.01)
H04L 12/16 (2006.01)

(52) U.S. Cl. ........ 455/415; 455/566; 455/416; 455/417; 370/260; 370/261; 370/271; 379/88.1; 379/93.17; 379/93.19; 379/93.23

(58) Field of Classification Search ................... 455/566, 455/415, 416, 417; 370/260, 261, 271; 379/88.11, 379/93.17, 93.19, 93.23
See application file for complete search history.

(56) References Cited

U.S. PATENT DOCUMENTS

| | | | |
|---|---|---|---|
| 5,533,110 A * | 7/1996 | Pinard et al. | 379/355.01 |
| 5,644,628 A * | 7/1997 | Schwarzer et al. | 379/93.19 |
| 6,545,669 B1 * | 4/2003 | Kinawi et al. | 345/173 |
| 2002/0077158 A1 * | 6/2002 | Scott | 455/567 |
| 2002/0093531 A1 | 7/2002 | Barile | |
| 2003/0011564 A1 * | 1/2003 | Ushino et al. | 345/156 |
| 2003/0073430 A1 * | 4/2003 | Robertson et al. | 455/416 |
| 2003/0119562 A1 * | 6/2003 | Kokubo | 455/566 |
| 2004/0205504 A1 | 10/2004 | Phillips | |

FOREIGN PATENT DOCUMENTS

| | | |
|---|---|---|
| DE | 19716316 | 10/1998 |
| EP | 0659006 | 6/1995 |
| EP | 1217809 | 6/2002 |
| JP | 2004274787 | 9/2004 |
| WO | 9708879 | 3/1997 |

OTHER PUBLICATIONS

Nietzer, P. et al.; "An IDSN Terminal With Graphical Telephone Interface. Oein ISDN_Endferaet mit Graphisher Telefonoberglaeche"; ITG Fachberichte, VDE Verlag; vol. 113, Jan. 1990; pp. 145-152; XP000618983.

* cited by examiner

*Primary Examiner* — Dwayne Bost
*Assistant Examiner* — Ariel Balaoing
(74) *Attorney, Agent, or Firm* — Lee, Hong, Degerman, Kang & Waimey

(57) ABSTRACT

A mobile communication terminal having a function of displaying a communication state and a method thereof are disclosed. The method of displaying a communication state in a case of a multiparty call using a mobile communication terminal having a plurality of display units includes displaying information on one calling party on a first display unit, and displaying information on the other calling party on a second display unit.

Here, information on one calling party and information on another calling party can be switched with each other and displayed on the different display units, and therefore voice communication is possible between one or more of the parties at the same time.

9 Claims, 6 Drawing Sheets

MOBILE COMMUNICATION TERMINAL HAVING FUNCTION OF DISPLAYING COMMUNICATION STATE AND METHOD THEREOF

CROSS REFERENCE TO RELATED APPLICATIONS

Pursuant to 35 U.S.C. §110(a). this application claims the benefit of the earlier filing date and right of priority to Korean Patent Application No. 10-2005-0092694, filed on Oct. 1, 2005, which is hereby incorporated by reference as if fully set forth herein.

BACKGROUND OF THE INVENTION

1. Field of the Invention

The present invention relates to a mobile communication terminal, and more particularly, to a mobile communication terminal for displaying various information in relation to voice communication by a dual display unit, and a method thereof.

2. Description of the Background Art

In general, recent mobile communication terminals have included entertainment functions, which are not directly related to voice communication functions, such as cameras, wireless Internet, moving pictures, or music playing, as well as communication functions.

That is, when the mobile communication terminals were released first, the functions that allow voice communication while on the move were enough. Recently, functions, which are not directly related to the voice communication, for example, a camera function, a camcorder function, or an MP3 function, have been merely combined with the mobile communication terminals. However, functions, which are capable of improving user convenience in terms of the voice communication functions of the mobile communication terminals, are not sufficiently supplied.

BRIEF DESCRIPTION OF THE INVENTION

Therefore, an object of the present invention is to provide a mobile communication terminal, having a function of displaying a communication state, that displays various call information on a dual display unit so as to improve user convenience in a case of a multiparty call and a method thereof in terms of communication functions.

Another object of the present invention is to provide a mobile communication terminal and a method thereof that are capable of preventing confusion that may occur during a multiparty call by clearly differentiating a calling party engaged in a current conversation from a calling party who waits.

Another object of the present invention is to provide a mobile communication terminal and a method thereof that are capable of preventing user's operating mistakes by differentiating an operating button for switching calling parties in case of a multiparty call from the other buttons.

To achieve these and other advantages and in accordance with the purpose of the present invention, as embodied and broadly described herein, there is provided a mobile communication terminal that is capable of displaying a communication state includes a memory unit that stores information on a plurality of calling parties, a plurality of display units that display the calling parties, respectively an input unit that receives any one of a signal for switching the displayed parties with each other or a signal for selective communication, and a control unit that controls a communication state and a display state of the display unit according to the signal from the input unit.

To achieve these and other advantages and in accordance with the purpose of the present invention, as embodied and broadly described herein, there is provided a mobile communication terminal that is capable of displaying a communication state includes a memory unit that stores information on a plurality of calling parties, a plurality of display units that display the calling parties, respectively, an input unit that receives a signal for communication with the plurality of parties at the same time, and a control unit that controls to allow the communication with the plurality of parties at the same time according to the signal from the input unit.

To achieve these and other advantages and in accordance with the purpose of the present invention, as embodied and broadly described herein, there is provided a method of displaying a communication state in a case of a multiparty call using a mobile communication terminal having a plurality of display units that includes displaying information on one calling party on a first display unit, and displaying information on the other calling party on a second display unit. Here, information on one calling party and information on another calling party can be switched with each other and displayed, and voice communication is possible between one or more of the parties at the same time.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
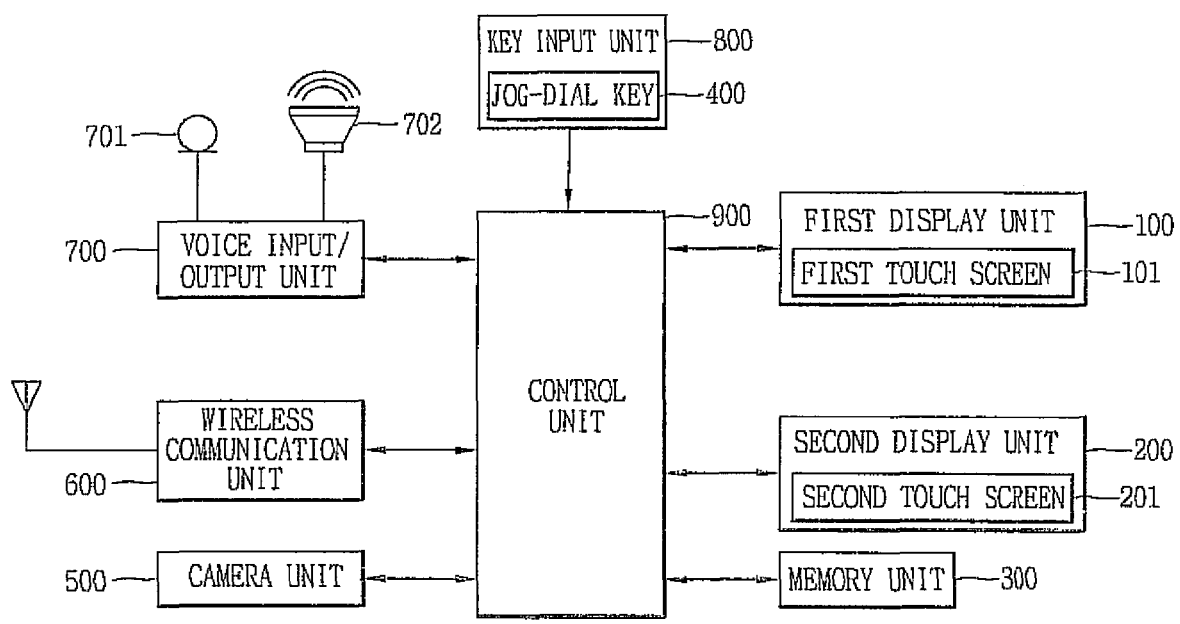
FIG. 1 is a block diagram showing the construction of a mobile communication terminal having a plurality of display units according to the present invention.

FIG. 1 is a block diagram showing the construction of a mobile communication terminal having a dual display unit according to the present invention.

Referring to FIG. 1, a voice input/output unit 700 converts voice, which is input through a microphone 701, into an electrical signal, and outputs the electrical signal to a wireless communication unit 600. On the other hand, the voice input/output 700 outputs a voice signal, which is input from the wireless communication unit 600, through a speaker 702.

The wireless communication unit 600 converts the voice signal, which is input from the voice input/output unit 700, into a wireless signal, and outputs the wireless signal through an antenna. The wireless communication unit 600 extracts a voice signal and a data signal from the wireless signal that is received through the antenna. The extracted voice signal is output to the voice input/output unit 700.

A camera unit 500 captures an image under the control of a control unit 900. A memory unit 300 stores various data and programs required for the control of a terminal, and images that are captured by the camera unit 500.

Further, the mobile communication terminal according to the present invention further includes a plurality of display units, for example, a first display unit 100 and a second display unit 200, each of which is capable of performing an input function and a display function at the same time.

The display units 100 and 200 may be separately provided or formed in a single body.

That is, two separate display units may be provided or one display unit may be divided into at least two different areas.

One or more of them have touch screen units, that is, a first touch screen 101 and a second touch screen 102, so as to perform an input function. The input function is a key (or button) input function or includes a drag input function.

Further, in the present invention, an input unit 800, which detects an input, such as a hot key (not shown) or a jog-dial key 400, is provided so as to immediately perform a predetermined function.

In addition, the control unit 900 controls the plurality of display units 100 and 200 so as to display various information in relation to voice communication. Further, when a predetermined key input is made in various voice communication modes and during voice communication, the control unit 900 controls the function blocks so as to perform a function that is set to the predetermined key.

The control unit 900 displays information on a calling party engaged in the voice communication on one of the first display unit 100 or the second display unit 200. The control unit 900 displays information on a waiting calling party on the other unit. Further, the control unit 900 controls such that the information on the calling parties can be switched between one another and selective voice communication is possible. The control unit 900 controls such that voice communication with the one calling party and voice communication with the other calling party are possible at the same time.

Here, the control unit 900 controls such that the displayed information on the calling parties can be switched with one another on the different display units, and is vertically or horizontally displayed on the same display unit according to selection. The switching of the information is performed by a button or drag by a predetermined length.

In addition, the displayed information on the calling party includes an avatar, an image, or a picture, and additionally includes information on a name and a telephone number of the calling party.

Further, when there is an incoming call from a third calling party during the call, a three party call starts according to a user's selection. Here, the control unit 900 may perform a secrete call function or a speaker phone function according to a user's selection.

In addition, the memory unit 300 stores as display information, identifier information for differentiating the calling parties from each other during a multiparty call. Under the control of the control unit 900, it is possible to display information on the calling parties during the multiparty call on the same one display unit in a desired predetermined direction and check the calling party, who transmits data, in a highlight mode.

In addition, the input unit 800 outputs an information switching signal to the control unit 900 by the button or the drag by the predetermined length, and selects a communication mode or call information display by any one of the button, the touch screen or the jog-dial.

Hereinafter, the operation and effect of the mobile communication terminal having the above-described construction will be described in detail.

Figure 2:
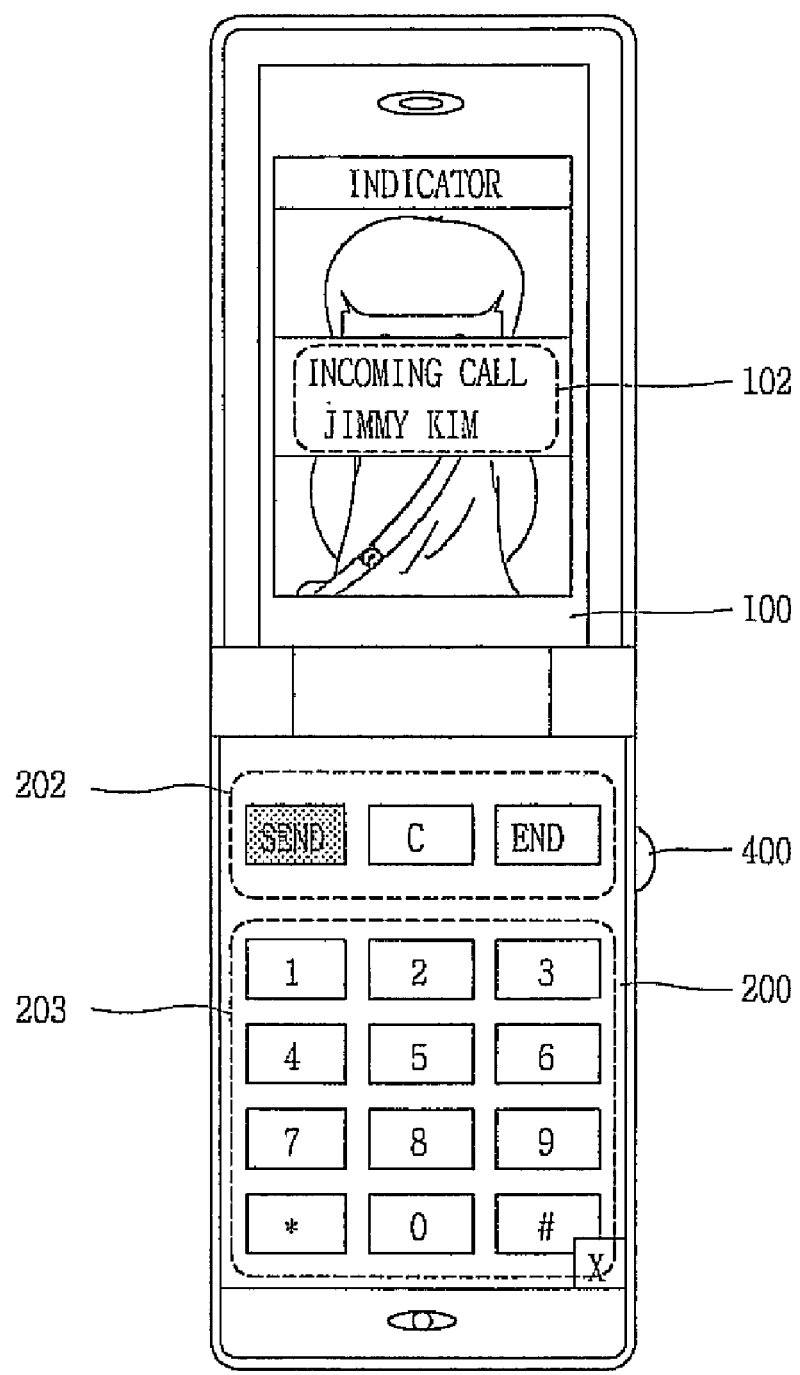
FIG. 2 is an exemplary view illustrating a method of receiving an incoming call while in an idle mode in a mobile communication terminal according to the present invention.

FIG. 2 is an exemplary view illustrating a method of receiving an incoming call while in an idle mode in a mobile communication terminal according to the present invention.

In general, the mobile communication terminal outputs a ring tone when an incoming call is received while in an idle mode. Correspondingly, when the terminal is a folder type terminal, a user, who notices the reception of the incoming call, unfolds a folder of the terminal for voice communication as illustrated in FIG. 2.

When the folder of the terminal is unfolded as described above, the control unit 900 of the terminal displays caller information 102 on a calling party of the incoming call on the first display unit 100.

When the caller information 102 previously registers in a phone book (not shown) of the user's terminal, information on the caller (e.g., a name, a character, a picture, an image or the like), which registers in the phone book, is displayed instead of a caller's telephone number. In FIG. 2, the caller's name (Jimmy Kim), which registers in the phone book, is displayed, and a caller's character is displayed as a background screen.

At this time, the control unit 900 displays on the second display unit 200, a call accept button (a SEND button) and a call reject button (an END button) as function buttons 202 for the control of voice communication. Further, another function button 203 may be displayed on the display unit 200. A numeral button is displayed as another function button 203. Kinds of the function buttons, which are displayed on the second display unit 200, vary according to operation modes of the terminal. Previously set function buttons are displayed under the control of the control unit 900.

Here, the second display unit 200 that displays the function buttons 202 and 203 is a display unit to which the touch screen 201 is applied. When the function buttons are displayed on the first display unit 100, the touch screen 101 needs to be applied to the first display unit 100.

As described above, the user who recognizes the incoming call by the output of the ring tone and the incoming message 102 that is displayed on the first display unit 100, presses the call accept button (SEND) when the user desires to answer the call from the caller.

Figure 3:
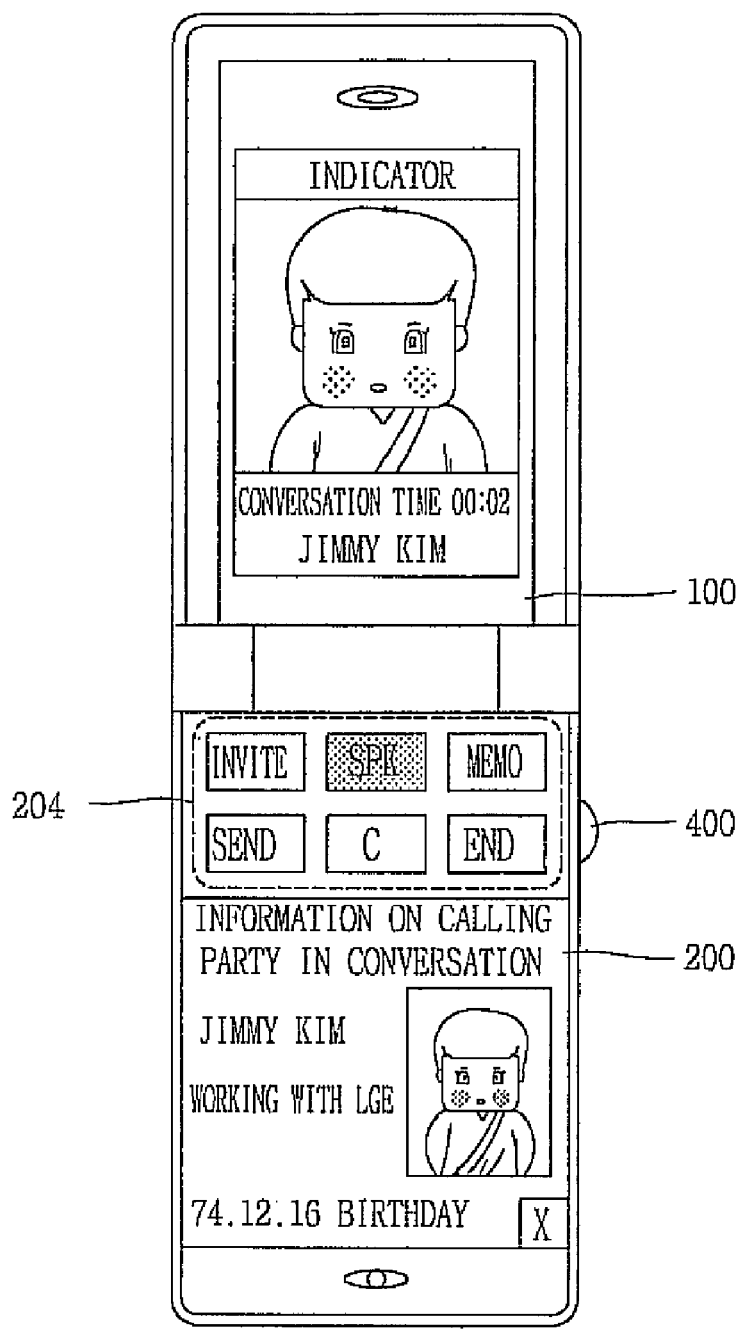
FIG. 3 is an exemplary view illustrating a method of displaying calling party information during call using a mobile communication terminal according to the present invention.

FIG. 3 is an exemplary view illustrating a method of displaying calling party information during a call using a mobile communication terminal according to the present invention.

When the call accept button (SEND) is input, the control unit 900 displays caller's main information on the first display unit 100 and caller's sub-information on the second display unit 200 as shown in FIG. 3.

Here, the main information includes caller's image information (a picture, an avatar, and a character), name (nickname) information, and conversation time information, and the sub-information includes detailed information (e.g., birthday, an e-mail, an occupation Cob), an image (picture and avatar), another contact address), a characteristic, personality, total conversation time, etc) on the caller, which register in the phone book of the terminal.

The conversation time information counts and displays conversation time with the calling party (caller) when the call starts. When the conversation is made with two or more calling parties (a multiparty call), main information, sub-information and conversation time information on all of the calling parties who are engaged in the multiparty call are individually managed and displayed.

In addition, various function buttons 204 that are used in a communication mode are added to the second display unit 200. The additionally displayed function buttons 204 include an invite button for inviting another caller to the call for a multiparty call, a spk button for a speaker-phone call, and a memo button for executing a memo mode during the call so as to take a memo.

For reference, in order to receive an input of the function buttons and a memo input in the memo mode, the control unit 900 needs to activate a function of the touch screen 201 of the second display unit 200. A memo that is input through the touch screen 201 is stored in the memory unit 300.

Figure 4:
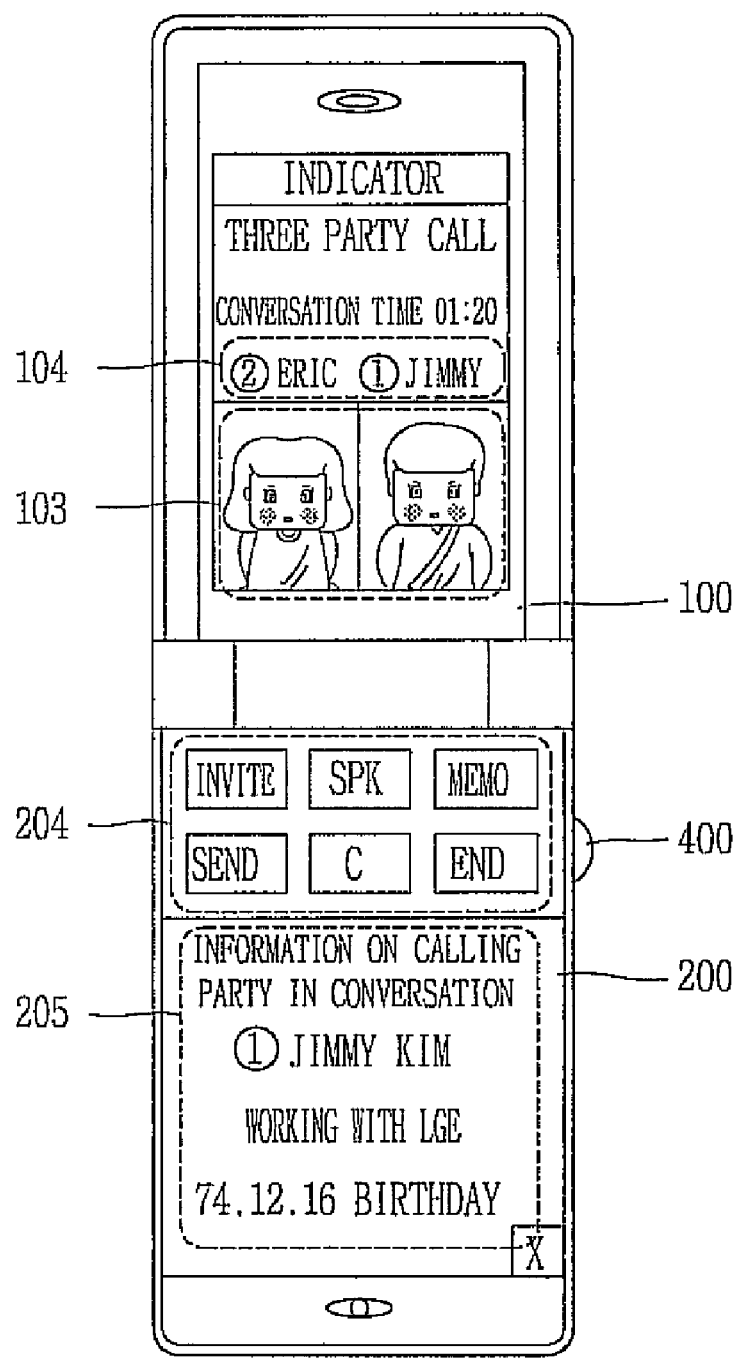
FIG. 4 is an exemplary view illustrating a method of displaying call information during a multiparty call using a mobile communication terminal according to the present invention.

FIG. 4 is an exemplary view illustrating a method of displaying call information during a multiparty call using a mobile communication terminal according to the present invention. Further, FIG. 4 is an exemplary view for explaining a method of establishing a three calling party call between a user and two callers.

Referring to FIG. 4, when a two party call is changed into a three party call or a four party call, that is, the number of calling parties increases, the control unit 900 divides a caller information display area 103 of the first display unit 100 by the number of parties so as to display callers' main information. In a case of the third party call, there are two calling parties. Therefore, the first display unit 100 includes the caller information display areas 103 that is divided into two.

The caller information display areas 103, which are divided by the number of parties, sequentially or alternately display the calling parties, or displays the parties by scrolling in the desired predetermined direction, such that a disadvantage of the small display unit can be compensated.

Here, sub-information on each of the parties, which is displayed on a sub-information display area 205 of the second display unit 200, sequentially displays information on all of the parties, who are engaged in a multiparty call, by dividing the sub-information display area 205, displays the information by scrolling in a direction desired by the user, or selectively displays information only on the calling party who is selected by the user.

In addition, when there are two or more calling parties as described above, information 104 for separating them from each other is also displayed. The identifier information 104 for separating the parties from each other includes an icon, a number, and an ID (or a name). Preferably, the identifier information 104 for separating the parties from each other is displayed together with the main information on each of the parties. The identifier information 104 displays a message indicating a 'three party call' on the screen such that the user can recognize the user is engaged in a multiparty call (three party call).

Figure 5:
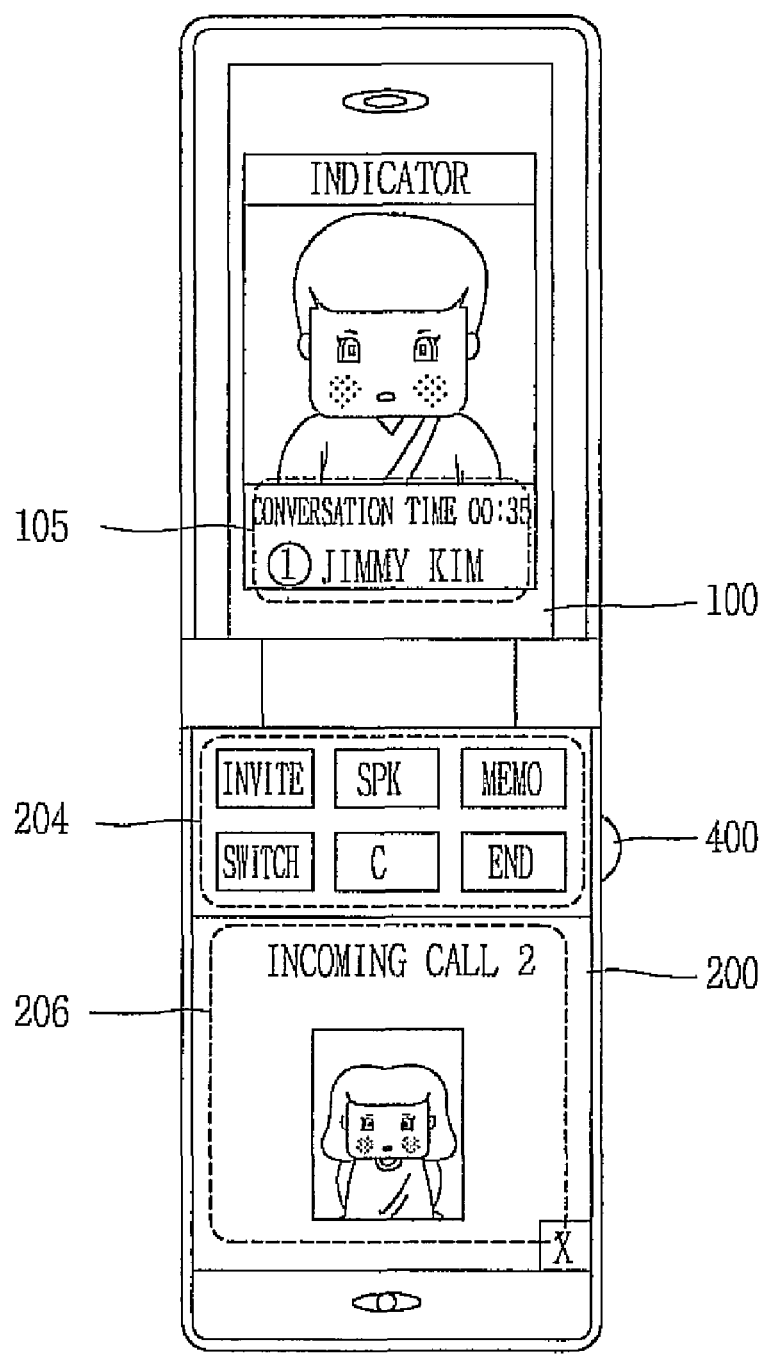
FIG. 5 is an exemplary view illustrating a method of displaying call information when a call is received from another calling party during call for a three party call.

FIG. 5 is an exemplary view illustrating a method of displaying call information when a call is received from another calling party during call for a three party call. During the call, call information 105 on a calling party (a first caller) engaged in a current conversation is displayed on the first display unit 100. At this time, when a call is received from another calling party (a second caller), second caller information 206 and a message (e.g., incoming call 2) indicating another call is received are displayed on the second display unit 200.

When the user wants to talk with the second caller who makes a call, the user presses the call accept button (SEND) among the function buttons that are displayed on the function button display area 204. When the call accept button (SEND) is input, the second caller is added as a calling party to the multiparty call. That is, a three party call is possible between the first and second parties and the user.

Whenever the user inputs the call accept button (SEND), the control unit 900 switches the first caller and second caller With each other to talk with the user. That is, the call accept button (SEND) is used to switch the calling parties in the case of the multiparty call.

However, when the user uses the multiparty call for the first time, the user is not aware of the method of switching the callers by using the call accept button (SEND). Therefore, in the present invention, as shown in the function button display area 204 of FIG. 5, the 'SEND' button is changed to a 'switch button'.

Then, the 'switch' button flickers or color and size thereof are differently displayed from the other buttons, such that the 'switch' button is made clearly visible. Therefore, it is possible for the user to easily switch the parties (callers) with each other during the multiparty call.

Figure 6:
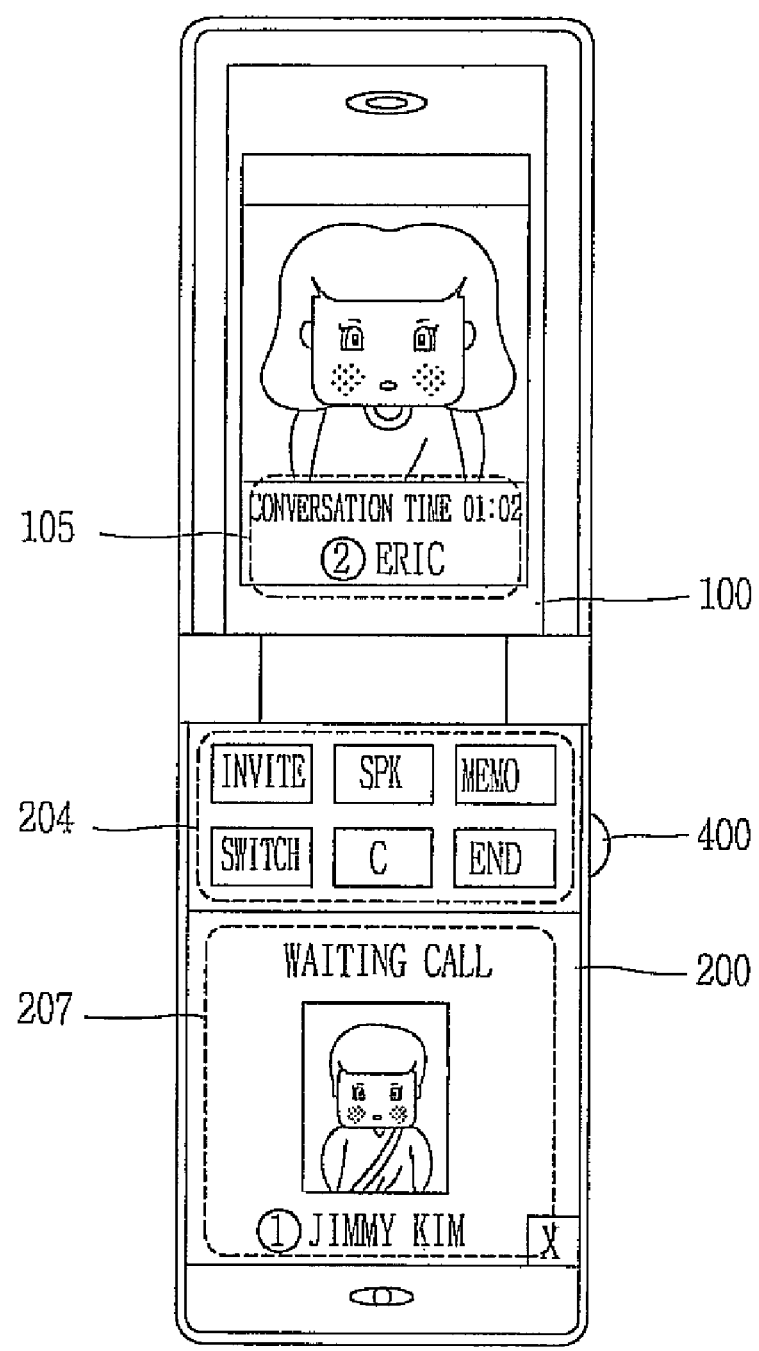
FIG. 6 is an exemplary view illustrating a method of switching parties during a multiparty call in a mobile communication terminal according to the present invention.

FIG. 6 is an exemplary view illustrating a method of switching parties during a multiparty call in a mobile communication terminal according to the present invention. Information on a calling party engaged in a current conversation is displayed on the first display unit 100 and information on a calling party who waits is displayed on the second display unit 200.

When the user switches the calling parties with each other by pressing a 'switch' button, information on the calling party (who waits), which was displayed on the second display unit 200, is displayed as information on the calling party engaged in a conversation on the display unit 100, and on the other hand, information on the calling party (who has been in a conversation), which was displayed on the display unit 100, is displayed as the calling party, who waits, on the second display unit 200.

As described above, when the calling party who is in the conversation and the calling party who waits are exchanged with each other, a message (e. g., a waiting call) indicating an idle state is displayed on a display area 207 where a calling party who waits is displayed.

In addition, as characterized by the present invention, when the calling party is not stored in a telephone directory, caller information is arbitrarily generated and displayed in the same way as the information on the caller engaged in the existing conversation.

That is, any one or more of the icon, the number (①, ②, . . . ), and the ID (a name) may duplicate and be used for the arbitrarily generated caller information. In a case of the ID, a name (e.g., name1, name2, . . . ), which is arbitrarily preset so as to be generated in the terminal, is automatically allocated and displayed on the caller information display area 105.

When calling parties are continuously added, the number used for the caller information is automatically increased. The waiting-calling party display area 207 is divided by the number of parties and caller information on the parties who wait is displayed on the divided display area 207. The caller information on the parties who wait, which is displayed by dividing the waiting-calling party display area 207, is sequentially or alternately displayed, or is displayed by scrolling in a desired direction, such as a vertical direction or a horizontal direction.

In addition, in order to differentiate the calling party who is engaged in the conversation from the calling party who waits, main information on the calling party displayed on the display unit 100 and main information on the calling party displayed on the display unit 200 have different sizes from each other or are highlighted.

Meanwhile, in the present invention, for user convenience, conversation time is counted for each of the parties. Therefore, when the calling party who waits is changed to the calling party who is engaged in the conversation, that is, the calling party waiting for the call, who is displayed on the second display unit 200, is changed to the calling party engaged in the conversation and thus is displayed on the first display unit 100, the conversation time displayed on the first display unit 100 is not the total conversation time (multiparty call conversation time) but individual conversation time with the calling party engaged in the conversation.

As described, the present invention has an effect of increasing user convenience by displaying various information in relation to voice conversation by using a dual display unit. In addition, the present invention has another effect that the user can refer to information on parties engaged in a multiparty call.

Moreover, the present invention has another effect of increasing user convenience by preventing user's confusion by clearly differentiating a calling party engaged in a current conversation from a calling party waiting for a call in a case of a multiparty call. Further, the present invention has another effect of preventing user's mistakes by differentiating an operation button for switching parties from the other buttons in case of a multiparty call.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method of displaying a communication status in a mobile communication terminal having a plurality of separate display units, the method comprising:
    displaying information of a first calling party who is engaged in conversation with the mobile communication terminal on a first display unit of the plurality of separate display units when the first calling party is registered in a phonebook stored in the mobile communication terminal and the information of the first calling party comprises at least a first character image and a first unique number associated with the first calling party, and does not include a phone number of the first calling party; and
    displaying information of a second calling party who is on hold and information of a third calling party who calls while the second calling party is on hold on a second display unit of the plurality of separate display units when the second calling party and the third calling party are registered in the phonebook,
    wherein the information of the second calling party comprises at least a second character image and a second unique number associated with the second calling party, the information of the third calling party comprises at least a third character image and a third unique number associated with the third calling party, and the information of the second calling party and the information of the third calling party do not include a phone number, and
    wherein the second calling party, the third calling party and additional calling parties on wait are automatically displayed in sequence or alternately when a number of the parties is larger than a preset number such that information of all parties cannot be displayed together on the second display unit at the same time.

2. The method of claim 1, wherein the first calling party who is engaged in the communication is highlighted on the first display unit.

3. The method of claim 1, wherein each of the first, second, and third character images is an avatar or a picture.

4. A mobile communication terminal configured to display a communication status on a plurality of separate display units, the terminal comprising:
    an input unit;
    a first display unit and a second display unit;
    a storage unit; and
    a controller coupled to the input unit, first display unit, the second display unit, and the storage unit, wherein the controller is configured to:
        display information of a first calling party engaged in conversation on the first display unit when the first calling party is registered in a phonebook stored in the storage unit, wherein the information of the first calling party comprises at least a first character image and a first unique number associated with the first calling party, and does not include a phone number of the first calling party; and
        display information of a second calling party who is on hold and information of a third calling party who calls while the second calling party is on hold on the second display unit when the first calling party and the second calling party are registered in the phonebook,
    wherein the information of the second calling party comprises at least a second character image and a second unique number associated with the second calling party and the information of the third calling party comprises at least a third character image and a third unique number associated with the third calling party, wherein the information of the second calling party and the information of the third calling party do not include a phone number, and
    wherein the first calling party, the second calling party and additional calling parties on wait are automatically displayed in sequence or alternately when a number of the parties is larger than a preset number such that information of all parties cannot be displayed together on the second display unit at the same time.

5. The terminal of claim 4, wherein the first calling party engaged in the communication is highlighted on the first display unit.

6. The terminal of claim 4, wherein the input unit is a button, a touch screen, or a jog-dial.

7. The method of claim 1, wherein at least one phone number of the first, second, or third calling party is displayed when at least one of the first, second, or third calling party is not registered in the phonebook.

8. The method of claim 1, wherein at least the information of the first, second, or third calling party is arbitrarily generated and displayed on the second display unit when the information of at least one of the first, second, or third calling party is not stored in the phonebook.

9. The method of claim 1, wherein the second unique number of the second calling party is assigned '1' and displayed, the third unique number of the third calling party is assigned '2' and unique numbers for the additional calling parties are assigned in an increasing order following '2' based on the order of time when calls were received by the mobile communication terminal from the additional calling parties and displayed.

* * * * *